United States Patent [19]
McLeish et al.

[11] Patent Number: 5,014,238
[45] Date of Patent: May 7, 1991

[54] UNIVERSAL INPUT/OUTPUT DEVICE

[75] Inventors: Anthony B. McLeish, Mississauga; Anthony Hill, Holland Landing; Jim Darling; David M. M. Dean, both of Oakville, all of Canada

[73] Assignee: Distributed Matrix Controls Inc., Rexdale, Canada

[21] Appl. No.: 442,255

[22] Filed: Nov. 28, 1989

Related U.S. Application Data

[63] Continuation of Ser. No. 76,538, Jul. 22, 1987, abandoned.

[51] Int. Cl.⁵ .......................... G06F 13/00; G06F 9/00
[52] U.S. Cl. ................................... 364/900; 364/926; 364/942; 364/949
[58] Field of Search ... 364/200 MS File, 900 MS File

[56] References Cited

U.S. PATENT DOCUMENTS

| | | | |
|---|---|---|---|
| 3,990,049 | 11/1976 | Wirth | 364/900 |
| 4,055,801 | 10/1977 | Pike et al. | 371/25.1 |
| 4,166,290 | 8/1979 | Furtman et al. | 364/200 |
| 4,339,819 | 7/1982 | Jacobson | 364/200 |
| 4,404,625 | 9/1983 | Saito et al. | 364/144 |
| 4,520,451 | 5/1985 | McLaughlin | 364/900 |
| 4,521,871 | 6/1985 | Galdun et al. | 364/900 |

Primary Examiner—Eddie P. Chan

[57] ABSTRACT

This invention relates to a universal device for sequentially sensing any input signals and providing any output signals, comprising; a microprocessor; a programmable memory for defining said input signals and said output signals at selected levels; multiplexers controlled by said microprocessor to sequentially select said input signals and said output signals; electrical components controlled by said microprocessor and programmable memory for generating a digital bit stream for each sequentially selected input signal and output signal; circuitry for translating said digital bit streams to an analogue signal; signal conditioning circuitry activated by said analogue signal for sensing any input signal and providing any output signal defined by said programmable memory.

10 Claims, 4 Drawing Sheets

UNIVERSAL INPUT/OUTPUT DEVICE

This is a continuation of application Ser. No. 07/076,538, filed July 22, 1987, now abandoned.

FIELD OF INVENTION

This invention relates to a universal input-output device, and particularly relates to an input-output device utilizing common electronic circuitry repeatedly for a variety of input and output signals for controlling and monitoring same through the use of software.

BACKGROUND TO THE INVENTION

Various kinds of machines and processes have heretofore been utilized to control or monitor machines, signals or devices.

For example, U.S. Pat. No. 4,607,333 relates to electronic beam exposure apparatus which is controlled by a program which stores the desired circuit pattern, and the data of the computer is supplied to an electrostatic deflector via a digital control circuit, digital to analogue convertors and amplifiers as a voltage which is proportional to the degree of deflection.

Moreover, U.S. Pat. No. 3,573,442 teaches a computer of the sample data type for performing, selecting, computing and combining functions and comprises a single time shared or multiplexed operational amplifier adapted to add and substract analogue signal quantities, through a plurality of input signals and to store the results to a plurality of output switches on memory devices such as capacitors, which results are culled out at proper times as analogue outputs and/or feedback signals.

Furthermore, U.S. Pat. No. 3,548,170 relates to a signal digital computer which takes over functions of all analogue controllers as a process whereby signals from the sensing elements feed into an input multiplexer so that the computer can scan them one at a time, such signals being converted to digital signals having discrete values before entering the computer. The output signals from the computer may be converted to analogue signals or remain digital. U.S. Pat. No. 3,548,170 utilizes individual circuits having different electronic components for input and for output, analogue and digital signals.

Finally, U.S. Pat. No. 4,404,625 discloses a programmable logic controller provided with a central control unit consisting of a microcomputer as firmware and input circuit adapted to act as an input interference between the external switches connected to input terminals and the central control unit, and output circuitry controlling external equipment converted to the output terminals in response to the output signal from the central control unit, a program memory for storing the sequence programs set by users as desired, a key input device to be used for monitoring or setting programs, and an indicator for indicating the instructions being sent at the program settings and also instructions being executed during execution of the program. More particularly the input and output circuitry of U.S. Pat. No. 4,404,625 are different and establish their characteristics from discrete components rather than software controlled pulse width modulated power sources.

Each of the foregoing devices have generally been designed to execute a specific monitoring or control function.

Present digital microprocessor technology for control purposes utilize discrete circuitry uniquely designed with specific electronic components to condition each type of input signal from sensing field equipment, and also utilize discrete circuitry uniquely set up with specific electronic components to provide each type of output signal required for controlling the field equipment. Furthermore inputs are handled independently of outputs in present day electronic circuitry.

It is an object of this invention to produce an improved input-output device which utilizes a common set of electronic circuitry repeatedly for a variety of input or output signals.

FEATURES OF INVENTION

In a universal device for sequentially sensing input signals from field devices or providing control output signals for controlling said field devices on a plurality of channels, comprising: signal conditioning circuitry connected to said field devices; programmable memory for storing data defining; each said field device connected to said signal conditioning circuitry; one of said channels as an input signal to said signal conditioning circuitry from one of said field devices; one of said channels as an output signal from said universal device to said one of said field devices; a microprocessor for controlling and activating said programmable memory; multiplexers connected to said microprocessor and in response to control signals from said microprocessing for selectively transmitting said data stored in said programmable memory corresponding to said input signals or said output signals; bit stream generating structure connected to said multiplexers and in response to said selected data from said multiplexer for generating a selected digital bit stream corresponding to said data representing said input signal or said output signal; a device for translating said digital bit streams to an analogue signal for each sequentially selected input signal and output signal; said signal conditioning circuitry activated by said analogue signal for sensing said input signals or providing said output signals, whereby said device is programmed so that said different input signals are monitored from said field devices or for providing different output signals to said field devices by said signal conditioning circuitry on each said channels respectively by varying the data stored in said programmable memory without changing said signal condition circuitry.

In an input-output device for sequentially sensing an input signal from a variety of field devices or providing an output signal to control a variety of field devices on a plurality of channels comprising: a microprocessor; signal conditioning circuitry being connected to each field device; programmable memory controlled by said microprocessor for storing data in said programmable memory whereby said data defines; each said field device connected to said signal conditioning circuitry; one of said channels as an input signal to said input-output device; one of said channels as an output signal from said input-output device to said one of said field device for controlling said one said field device in response to said input signal; multiplexers connected to said microprocessing and in response to control signals from said microprocessing for selectively transmitting said data stored in said programmable memory corresponding to each said input signals and said output signals on each one of said channels; a video RAM connected to said multiplexers and in response to said selected data from said multiplexers for sequentially generating a digital bit stream corresponding to said data representing each said input signal and output signal; a device for translating said digital pulse bit stream to an analogue signal from each said input signal and output signal; said signal conditioning circuitry activated by each said analogue signal for sequentially: sensing each said selected input signal from said field devices on said selected channel, and providing each said selected output signal to said field devices for controlling said field devices on said selected channel, for each signal selected by said multiplexer from said channels whereby said input-output device may be programmed so that different input signals are monitored and different output signals are provided by said signal conditioning circuitry on each said channel by varying said data stored in said programmable memory without changing said signal conditioning circuitry; a program able gain amplifier coupled with said signal conditioning circuitry for amplifying said analogue signals sensed by said signal conditioning circuitry within a preselected range; a digital to analogue converter for converting a digital signal from said microprocessing to an analogue signal: a comparator for comparing said amplified analogue signal from said programmable gain amplifier with said analogue signal from said digital to analogue converter.

DRAWINGS

DETAILED DESCRIPTION OF THE INVENTION

Identical parts have been given identical numbers throughout the figures.

Figure 1:
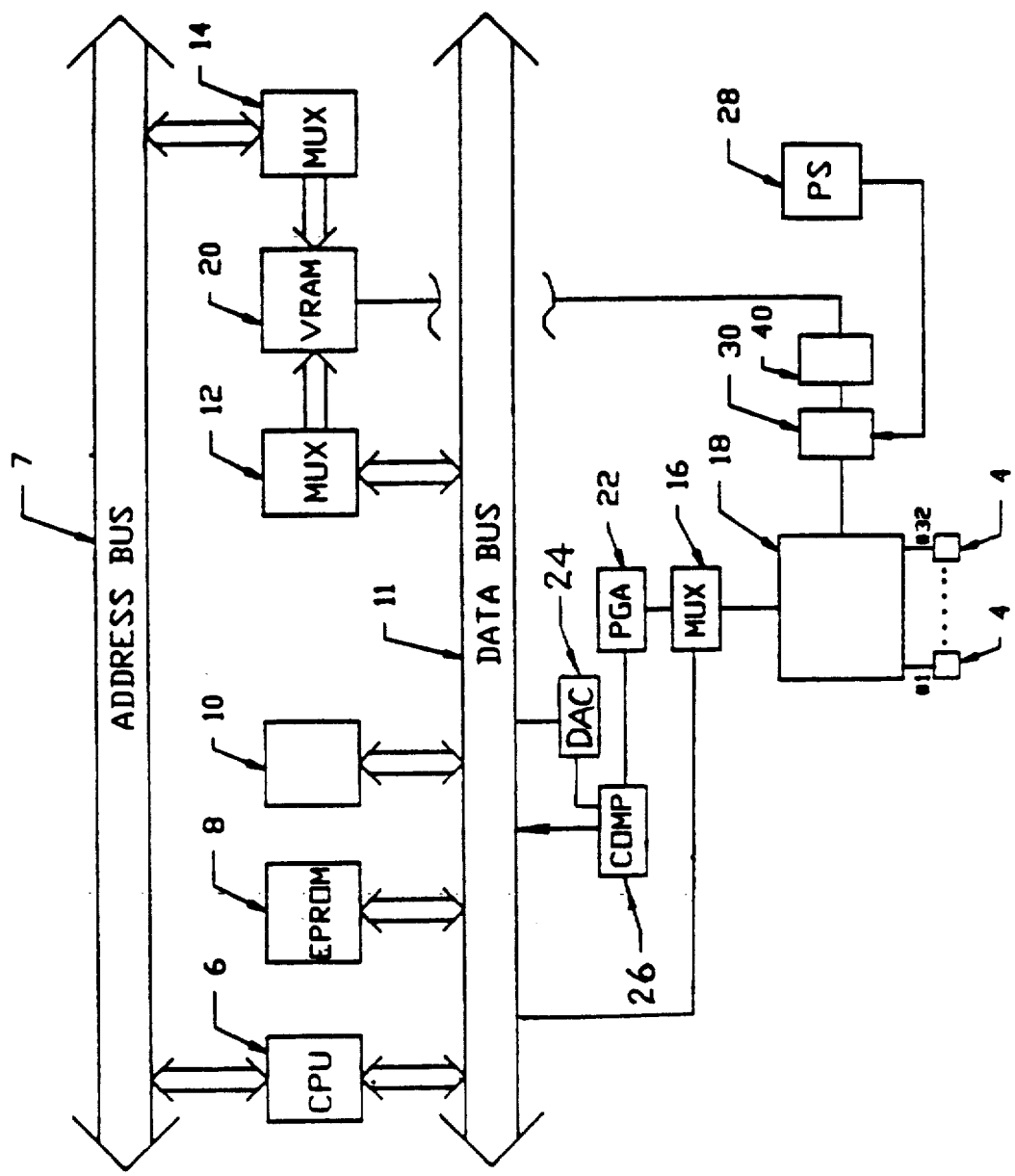
FIG. 1 is a schematic view of the input output device.

FIG. 1 discloses generally the input-output device 2 which is adapted to be connected by suitable wiring (not shown) to field devices 4. For example field device 4 may comprise either a resistance temperature detector, thermister, thermocouple, or voltage or current reading.

Figure 2:
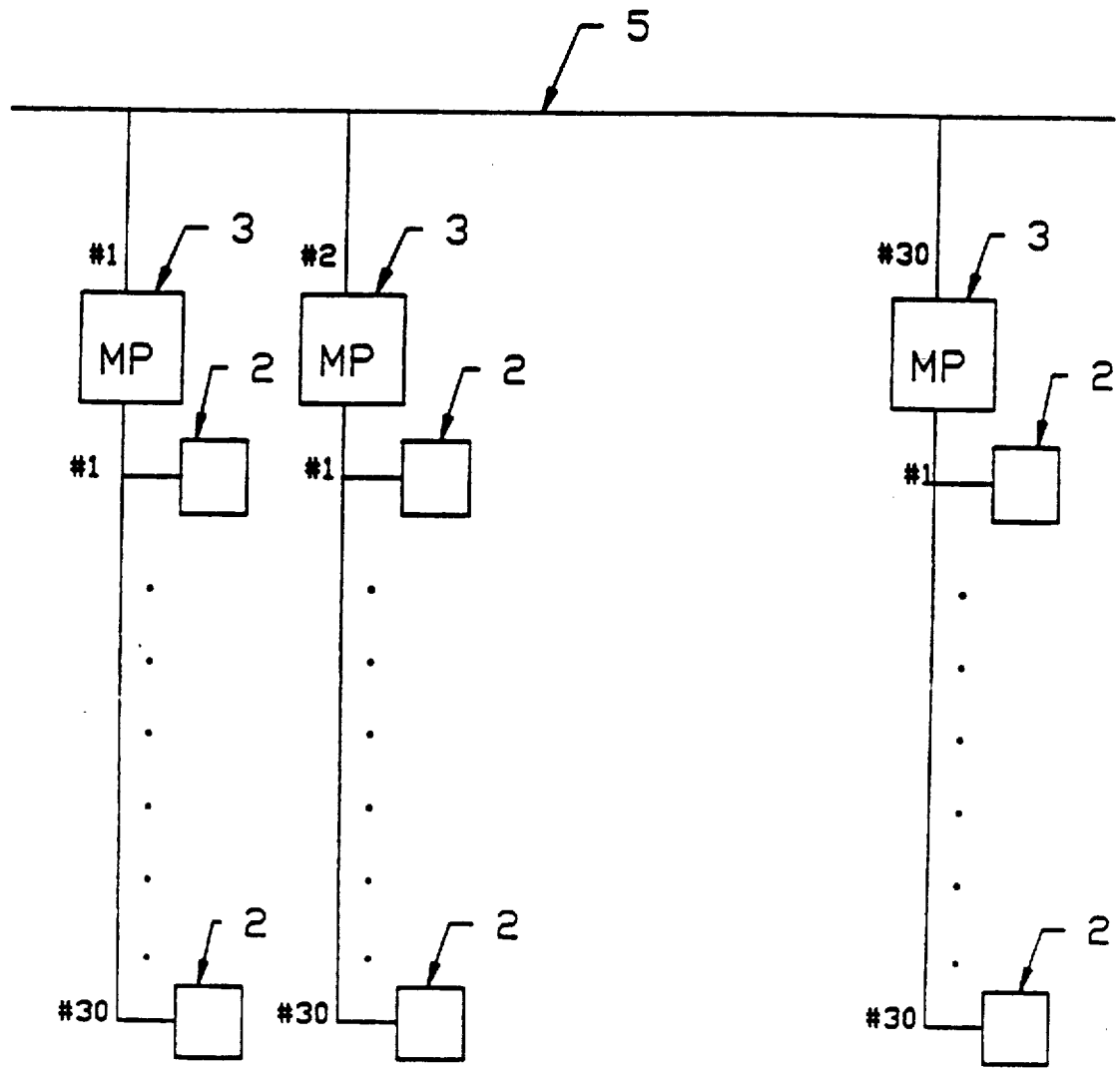
FIG. 2 is a configuration diagram illustrating a subsystem of input output devices connected to main processing units.

FIG. 2 is a diagram which illustrates the configuration utilized in the embodiment described herein, where thirty input output devices 2 (IOP number) in a subnetwork may be controlled by a main processing unit or MP 3, and up to thirty main processing units (MP number) or MP 3 may be connected by a Backbone Local Area Network (Lan) 5. Each MP 3 controls up to thirty input output devices 2. Although FIG. 2 illustrates thirty MP 3, and thirty input output devices 2, any number of MP 3, or input output devices 2 may be utilized without departing from the spirit of this invention.

Each MP 3 is adapted to initiate a command which is carried out by central processing unit 6 of input output device 2.

The input-output device 2 is adapted to condition or monitor input signals from field devices 4 and provide for output signals required for controlling the field device 4 on a channel in a manner to be more fully particularized herein.

The invention to be described herein is adapted to accomodate 32 field signals on 32 channels, although the input-output device 2 can be modified to accomodate any number of channels without departing from the spirit of the invention to be described herein.

The input-output device 2 includes a central processing unit 6, EPROM or memory 8, a serial communication controller or keyboard 10, multiplexers 12, 14, 16, signal conditioning circuitry 18, program gain amplifier (PGA) 22, digital to analogue converter (DAC) 24, comparator 26, power source 28, and voltage level shifters 30. The input-output device 2 also includes means 20 for generating a digital bit stream to activate the signal conditioning circuitry in a manner to be more fully particularized herein. The preferred embodiment herein describes a VRAM 20 to accomplish the generation of said bit stream although shift registers or counters could also be utilized.

Figure 3:
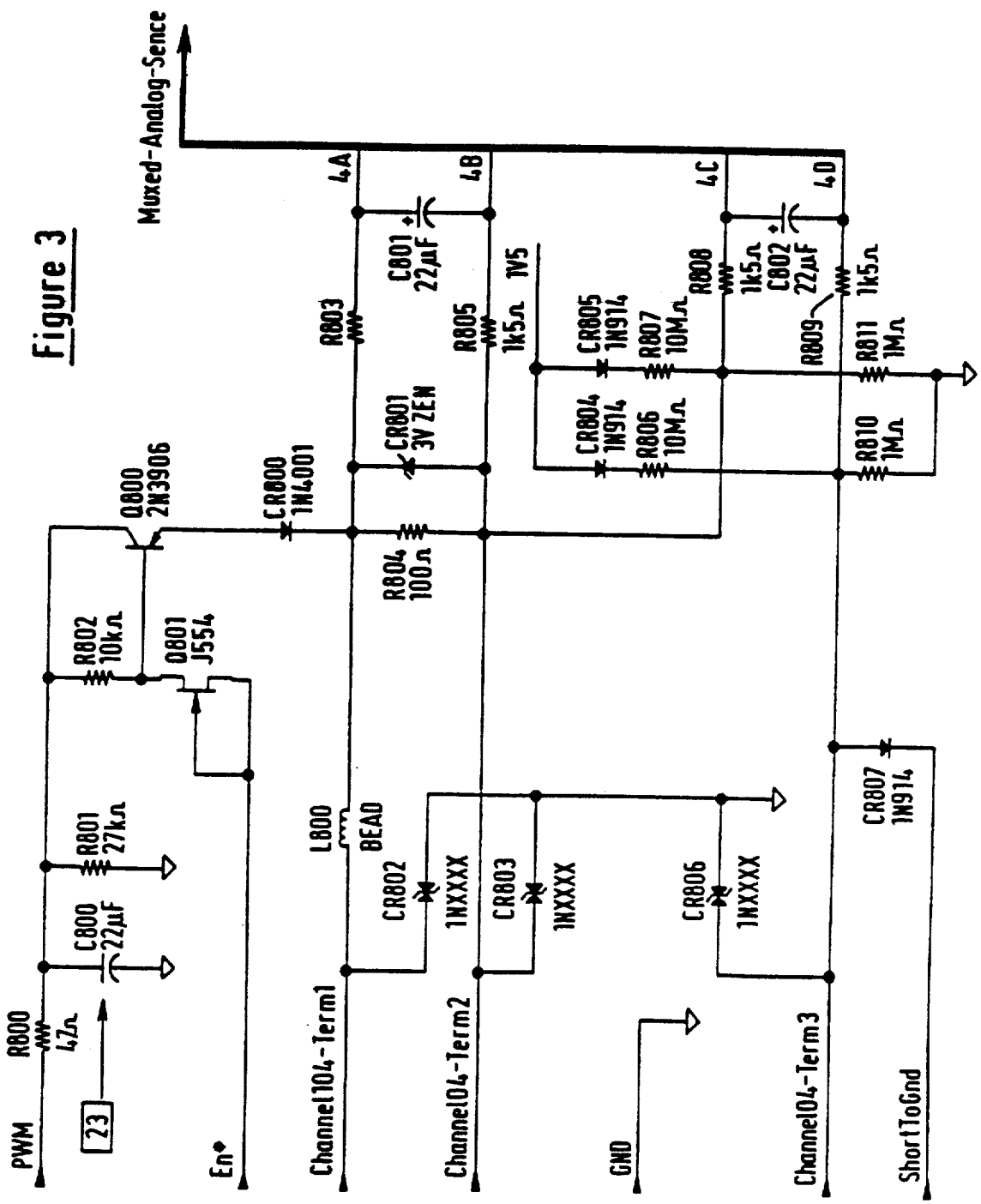
FIG. 3 is a representative schematic diagram of the signal conditioning circuitry for one channel.

FIG. 3 is a representative schematic diagram of the signal conditioning circuitry for one channel identified as channel 104. The signal conditioning circuitry 18 of the invention herein utilizes thirty-two channels, although the signal conditioning circuitry may be adapted to accomodate any number of channels without departing from the spirit of this invention.

A field device 4 is connected to a channel. Each channel includes 4 terminals, TERM 1, TERM 2, TERM 3, and a ground so as to entitle a user to connect any one of the following signal inputs or outputs from a transducer or field device 4:

| ANALOGUE INPUTS | ANALOGUE OUTPUTS |
|---|---|
| eg. Voltage 0–10 VDC | eg. Voltage 0–10 VDC |
| Current 4–20 | Current 4–20 ma |
| Resistance Temperature Detector | Pulse Width Modulated |
| Thermocouple, Types J, K and T | Signal |
| Thermister | |
| DIGITAL INPUTS | DIGITAL OUTPUTS |
| eg. On Off Status | eg. On Off Status |
| PULSE INPUTS | |
| eg. 0–10 Hz | |

The signal conditioning circuitry 18 comprises analogue circuitry which is utilized to:

(a) filter noise;

(b) provide electrical protection from electro magnetic interference (EMI);

(c) provide common mode voltage noise suppression;

(d) sense the input and outputs referred to above.

The CPU 6 utilizes a software program with predefined parameters to be selected and stored in memory 8 by means of keyboard 10.

EPROM 8 has embedded therein fixed software program for configuring the input output device 2 and shall be described herein. In order for the user to define what type of field device or transducer 4 is wired to each channel the user must define or configure the system using embedded software in EPROM 8. More particularly the input output device 2 may be activated by keyboard 10 to present the configuration menu program which is stored in memory 8 thus allowing the user to configure and define the input output parameters for each channel to be controlled or monitored by the input output device 2.

VRAM 20 is adapted to generate a bit serial pulse stream between zero and 4,096 bits of information for each channel at a rate of 24 Mhz and also includes configuration memory for storing the configured parameters in the conventional RAM section of VRAM 20. The input-output device 2 can also be adapted to operate at a clock frequency other than 24 Mhz. The keyboard 8 is utilized to configure the RAM section of VRAM 20 as well as provide status information.

Although the preferred embodiment disclosed herein utilizes VRAM 20 to generate said pulse stream, shift registers or counters could also be used in the place of VRAM 20 provided the components were organized as 32 by 4,096 bit shift registers. In other words the components would be organized to generate a bit serial, pulse stream between zero and 4,096 bits of information on 32 channels. If VRAM 20 is replaced with shift registers it is still necessary to utilize a RAM for storing the configured parameters. Although the preferred embodiment herein describes the use of a bit stream between zero and 4,096 bits, any even number below or higher than 4,096 could be utilized.

The input-output device 2 described herein may be programmed to monitor or control any analogue, digital or pulse input or output signals from the field devices 4 referred to above.

In order to define the type of field device or transducer 4 which is wired to the terminals of each channel so as to configure a particular channel, the user of the input-output device 2 will activate the keyboard 10 so as to present the "Point Configuration" option from the system menu from EPROM 8. For example, the system menu sequentially takes the user through the following type of questions and answers:

1. Point Name - the user defines the name of the point. For example the user may define the temperature of a particular room.
2. Point Type - the user defines whether the point is an analogue input, analogue output, digital input or digital output.
3. Define the MP Number (define the particular main processing unit referred to in FIG. 2).
4. Define IOP Number (define the particular input output device 2 described in FIG. 2).
5. Define channel number (there are up to thirty-two channels for each input output device 2) on which the field device or transducer 4 is wired to the signal conditioning circuitry 18.
6. Define the sensor type - the user selects one of the following:
- resistance temperature detector
- thermocouple
- thermister
- voltage
- current If the user has selected an analogue input, a submenu requests the user to select items such as:
(a) a base - lowest valid value
(b) span - maximum valid value Furthermore the user will also define a linerization, compensation and conversion to engineering units in accordance with procedures well known to those persons skilled in the art. Alarm limits are also set so that an alarm may visually appear on a screen in the event that a reading appears at a preselected value between the base and the span.

If the user selects an analogue output a submenu requests the user to select such things as:
(a) top scale
(b) bottom scale as well as define the Feed Back Point which associates the analogue output with an analogue input for purposes of controlling to a desired result.

If the user selects a digital input, a submenu requests the user to define the Activation Mode more or less as:
(a) normally open
(b) normally closed If the user selects a digital output a submenu requests the user to define the Activation Mode more or less as:
(a) normally open
(b) normally closed
(c) momentary
(d) maintained By following the process referred to above the user can program the input-output device 2 so as to control or monitor the type of field sensor or transducer 4 to be wired to the terminals of the channel. All thirty-two channels are programmed in this fashion. It should be noted that no changes to any hardware of the input-output device 2 or field hardware 4 is required when configuring the input-output device 2 through software embedded in EPROM 8 as described above.

For illustration purposes only, channel 1 may be programmed for an analogue output signal having a voltage of 0-10 VDC. Channel 2 may be programmmed for an analogue input signal from a Resistance Temperature Device, whereas Channel 3 may be programmed for an analogue output signal having a value between 0-10 VDC; and so on.

Means 20 for generating a bit stream such as VRAM or shift registers 20 is adapted to generate a bit pattern between 0-4,096 bits of information at a rate of 24 Mhz. Each channel which has been programmed in the fashion referred to above has its own method of manipulating the VRAM 20 stored in EPROM 8. More particularly, a software program resident in EPROM 8 links with the RAM portion of VRAM 20 which determines the pulse stream pattern generated by VRAM 20.

For example, if one of the channels monitors a flow transducer 4 within a range of 0 and 200 gallons per minute and a desired value of 100 gallons per minute is required, the input-output device 2 would be programmed so that the 0-200 gallons per minute would correspond to an analogue input into the input output 2 of a value of 0-10 VDC respectively. If a second channel is programmed to provide a control output signal to a final control element which modulates the flow to a desired value of 100 gallons per minute, within an output voltage range of 0-10 VDC, then the VRAM 20 would generate a pattern with 2,048 bits "on" and 2,048 bits "off" to represent the 5 VDC required on 100 gallons per minute.

Figure 4:
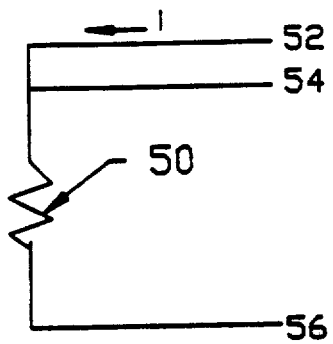
FIG. 4 is a schematic diagram of an analogue input.

The input-output device 2 shall now be described in relation to reading a transducer of field device 4 having an analogue input into the input-output device 2 such as a Resistance Temperature Device or Thermister shown as a load resistance 50 in FIG. 4. The terminals 52, 54 and 56 of the load resistance 50 of Resistance Temperature Device or Thermister are connected to Term 2, Term 3 and ground of a particular channel.

The CPU 6 the address bus 7 and data bus 14 to select through first multiplexer means, multiplexer 14 and 12, the appropriate message in VRAM or shift registers 20 which corresponds to the field device 4 wired to signal conditioning circuit 18 that has been programmed in the fashion referred to earlier.

In the case of sensing an analogue input into the input-output device 2 from the Resistance Temperature Device or thermister 4, a small impressing current i is generated throught load 50 and voltage reading taken by the input-output device 2 on the particular channel.

The small impressing current i is generated by means of VRAM or shift registers 20 which generates a relatively low bit stream such as 10 bits "on" for purposes of impressing current i.

A shift register 40 is utilized for buffering the bit stream from VRAM 20 from 24 MHz to 3 M Hz. Thereafter level shifters 30 are utilized to translate the bit stream pattern to appropriate voltage levels. More particularly the level shifters 30 are connected to power supply 28. The power supply 28 has a voltage of 28 volts. The duration which the shifters 30 are "on" is determined by the duty cycle of the "bit" pattern, as the voltage storage capacitors 23 in FIG. 3 will change to fractions of the 28 volt power supply, which is then applied to the conditioning circuitry 18.

In order to impress current i through the Resistance Temperature Device or thermister 4, the CPU 6 uses address bus 7 and data bus 11 to select through multiplexers 14 and 12 the appropriate message in VRAM 20 to generate the appropriate message in VRAM or shift registers 20 to generate the appropriate bit pattern which is buffered through shift registers 40 and translated by voltage shifters 30 to operate the appropriate signal conditioning circuit 18 for impressing current i to the appropriate transducer of the field device 4. Thereafter a voltage output from Resistance Temperature Device or thermister 4 is read across load resistance 50 by means of the signal conditioning circuit 18, multiplexer 16, PGA 22, DAC 14 and comparator 26.

More particularly second multiplexer means, multiplexer 16 selects the voltage output eminating from resistance load 50 on the same channel and such signal is manipulated by PGA 22 so as to provide a signal gain as necessary in order to amplify the analogue voltage output between 0 and 10 VDC. Thereafter analogue voltage output is compared by comparator 26 to the analogue signal level of DAC 24 which is being altered by CPU 6 through address bus 7 and data bus 11 to make the analogue output of DAC 24 equal to the value eminating from PGA 22. Once the analogue output of DAC 24 equals the value eminating from PGA 22 the CPU 4 has effectively read the analogue input signal from field device 4. Instead of utilizing a DAC a discrete analogue to digital integrated converter could also be utilized.

If the transducer 4 is a thermocouple there is no need for impressing current i as the input-output device 2 reads the analogue input from such field device 4 in accordance with the procedure described above.

The input-output device 2 shall now be described in relation to an analogue output to a transducer of the field device 4. If the value represented by the position to which CPU 6 operates DAC 24 is not the value desired by the control parameters stored in memory 8, or if the input-output device 2 is commanded by MP to change the output of a particular field device 4, then VRAM or shift registers 20 is given a change by CPU 6 through address bus 7 and data bus 11 by means of multiplexers 12 and 14.

For example, if one of the channels monitors a field device having a flow transducer with a range of 0–200 gallons per minute and a desired value of 100 gallons per minute is required, the configuration program would be configured with the use of an associated control algorithm previously configured so that the 0–200 gallons per minute would correspond to a value of 0–10 VDC with a voltage output of 5 VDC via transducer 4 representing the desired 100 gallon per minute flow. A VRAM or shift registers 20 generation of 2,048 bit stream would represent the desired 5 VDC output or 100 gallon per minute desired flow. If the desired flow fell below the 100 gallon per minute value, VRAM 20 would be given a change by CPU 6 through address bus 7 and data bus 11 so as to generate a bit stream of 2,048 bits which stream would be buffered by shift registers 40, translated by voltage shifters 30, and conditioned by signal conditioning circuitry 18 so as to manipulate the field device 4 to correct the analogue signal output to the desired result.

Figure 5:
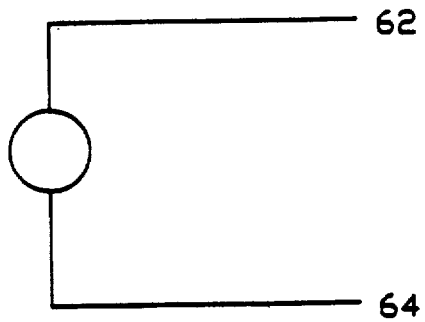
FIG. 5 is a schematic diagram of an analogue current input.

FIG. 5 illustrates a field device or transducer 4 for an analogue current input or output. The terminal 62 and 64 of transducer 4 are connected to Term 1 and Term 2 of a particular channel.

Figure 6:
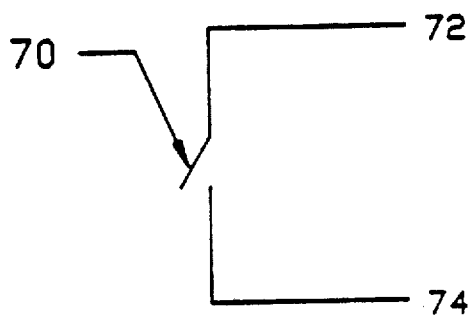
FIG. 6 is a schematic diagram of a digital input.

FIG. 6 illustrates a field device or transducer 4 for a digital input on a particular channel. The field device 4 consists of a switch 70, with terminals 72 and 74 connected to Term 2 and ground respectively of signal conditioning circuitry 18.

In order to sense a digital input into input-output device 2 on a particular channel, CPU 6 selects the appropriate message in VRAM or shift registers 20 to generate a bit stream which is buffered by shift registers 40 and translated by voltage level shifters 30 so as to produce a sense voltage generally between 5–24 VDC which is conditioned by signal conditioning circuitry 18 prior to being applied to the digital field device 4. If the switch 70 of field device 4 is open then the sensing voltage is returned by the field device 4 to the signal conditioning circuitry 18 which represents one condition. If the switch 70 is closed a short to ground exists and the sensing voltage is not returned to the signal conditioning circuitry 18, which represents another condition.

A digital output would operate in similar fashion.

Figure 7:
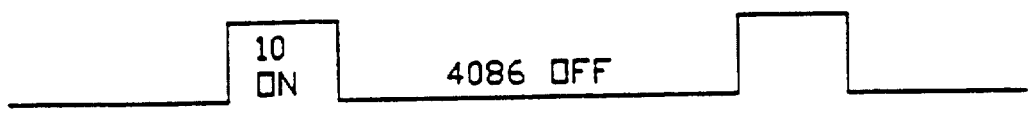
FIG. 7 is a diagram of a pulse width modulated output signal.

The input-output device 2 produces pulse width modulated outputs, which are an adaption of the analogue output referred to herein. Field devices 4 such as valves, damper, motors, and pneumatic to current converters may be controlled by pulse width modulated signals. The input output device 2 may generate a pulse width modulated signal on a particular channel by utilizing VRAM 20, voltage shifters 30 and the power supply 28. The modulation of the pulse stream from VRAM or shift registers 20 is determined by turning "On" or "Off", the pulse stream as illustrated in FIG. 7.

Field device 4 such as valves, damper motors, and pneumatic to current converters characteristically will respond to pulse width modulated signal differently, based on the duty cycle of the pulse width modulated signal which is defined as the ratio of "On" to "Off" bits. For example, a particular motorized damper if so designed will open a fixed percentage if the pulse width signal has a 10% duty cycle, and such damper will change position if a 25 percent duty cycle is applied the same.

The input-output device 2 utilizes the same analogue circuitry in the signal conditioning circuitry 18 to be connected to different types of field signals for the purpose of data acquisition into the digital microprocessor 6. By utilizing multiplexers 12, 14 and 16 thirty-two signals may be accomodated by input output device 2.

The input output device described herein may be utilized in the following areas:
 (a) supervisory control and data acquisition;
 (b) building and factory automation systems;
 (c) process control systems;
 (d) monitoring and control systems;
 (e) programmable logic control systems;
 (f) data acquisition systems.

Although the preferred embodiments, as well as the operation and use have been specifically described in relation to the drawings, it should be understood that variations in the preferred embodiments could easily be achieved by a skilled man in the trade without departing from the spirit of the invention. Accordingly, the invention should not be understood to be limited to the exact form revealed in the drawings.

The embodiments of the invention in which an exclusive property or privilege is claimed are defined as follows:

1. In a universal device for sequentially sensing input signals from field devices or providing control output signals for controlling said field devices on a plurality of channels, comprising:
 (a) signal conditioning circuitry means connected to said field devices;
 (b) programmable memory means for storing data defining:
   (i) each said field device connected to said signal conditioning circuitry means;
   (ii) one of said channels as an input signal to said signal conditioning circuitry means from one of said field devices;
   (iii) one of said channels as an output signal from said universal devices to said one of said field devices;
 (c) microprocessing means for storing and accessing said programmable memory means;
 (d) first multiplexer means connected to said microprocessing means and in response to control signals from said microprocessing means for selectively transmitting said data stored in said programmable memory means corresponding to said input signals or said output signals;
 (e) bit stream generating means connected to said first multiplexer means and in response to said selected data from said multiplexer means for generating a selected digital bit stream corresponding to said data representing said input signal or said output signal;
 (f) means for translating said digital bit streams to an analogue signal for each sequentially selected input signal and output signal;
 (g) said signal conditioning circuitry means activated by said analogue signal for sensing said input signals or providing said output signals, whereby said device is programmed so that said different input signals are monitored from said field devices or for providing different output signals to said field devices by said signal conditioning circuitry means on each said channels respectively by varying the data stored in said programmable memory means without changing said signal condition circuitry means.

2. A device as claimed in claim 1 wherein said bit stream generating means comprises shift register means for generating said digital bit stream between zero and 4,096 bits of information at a preselected frequency for each selected input signal and output signal.

3. A device as claimed in claim 1 wherein said bit stream generating means comprises video RAM means for generating said digital bit stream for each selected input signal and output signal.

4. A device as claimed in claim 3 wherein said signal conditional circuitry means includes 32 channels.

5. A device as claimed in claim 3 wherein said video ram means generates a digital bit stream between zero and 4,096 bits of information at a preselected frequency for each sequentially selected input signal or output signal.

6. A device as claimed in claim 5 wherein said programmable memory means comprise:
 (a) software fixed in EPROM for defining said input signals or said output signals;
 (b) random access memory means included in said video RAM means for storing said defined input signals or output signals.

7. A device as claimed in claim 6 wherein said random access memory means is separate from said video RAM means.

8. A device as claimed in claim 6 wherein said translating means comprise voltage shifters associated with a power source for generating a variety of preselected analogue signals.

9. In an input-output device for sequentially sensing an input signal from a variety of field devices or providing an output signal to control a variety of field devices on a plurality of channels comprising:
 (a) microprocessing means;
 (b) signal conditioning circuitry means being connected to each field device;
 (c) programmable memory means controlled by said mircroprocessor means for storing data in said programmable memory means whereby said data defines:
   (i) each said field device connected to said signal conditioning circuitry means;
   (ii) one of said channels as an input signal to said input-output device;
   (iii) one of said channels is an output signal from said input-output device to said one of said field device for controlling said one said field device in response to said input signal;
 (d) first multiplexer means connected to said microprocessing means and in response to control signals from said microprocessing means for selectively transmitting said data stored in said programmable memory means corresponding to each said input signals and said output signals on each one of said channels;
 (e) video RAM means connected to said first multiplexer means and in response to said selected data from said multiplexer means for sequentially generating a digital bit stream corresponding to said data representing each said input signal and output signal;
 (f) means for translating said digital pulse bit stream to an analogue signal for each said input signal and output signal;
 (g) said signal circuitry conditioning means activated by each said analogue signal for sequentially;
   (i) sensing each said selected input signal from said field devices on said selected channel, and (ii) providing each said selected output signal to said field devices for controlling said field devices on said selected channel, for each signal selected by said first multiplexer means from said channels whereby said input-output device may be programmed so that different input signals are monitored and different output signals are provided by said signal conditioning circuitry means on each said channel by varying said data stored in said programmable memory means without changing said signal conditioning circuitry means;

(h) programmable gain amplifier means coupled with said signal conditioning circuitry means for amplifying said analogue signals sensed by said signal conditioning circuitry means within a preselected range;

(i) digital to analogue converter means for converting a digital signal from said microprocessor mans to an analogue signal;

(j) comparator means for comparing said amplified analogue signal from said programmable gain amplifier means with said analogue signal from said digital to analogue converter.

10. In an input-output device as claimed in claim 9 whereby said input or output signals may be programmed as analogue signals or digital signals.

* * * * *